(12) United States Patent
Lakshmipathy et al.

(10) Patent No.: US 10,777,065 B2
(45) Date of Patent: Sep. 15, 2020

(54) FIRE TYPE DETECTION AND NOTIFICATION

(71) Applicant: Carrier Corporation, Palm Beach Gardens, FL (US)

(72) Inventors: Prasad Babu Lakshmipathy, Telangana (IN); Sowmya Paturu, Telangana (IN); Saurabh Kumar Sinha, Telangana (IN); Sreeramya Soratkal, Telangana (IN); Jignesh Soneji, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/418,070

(22) Filed: May 21, 2019

(65) Prior Publication Data

US 2019/0371155 A1    Dec. 5, 2019

(30) Foreign Application Priority Data

May 31, 2018  (IN) .............................. 201811020422

(51) Int. Cl.
*G08B 21/18* (2006.01)
*G06F 9/54* (2006.01)
*G08B 29/04* (2006.01)
*G08B 17/06* (2006.01)

(52) U.S. Cl.
CPC ........... *G08B 21/182* (2013.01); *G06F 9/542* (2013.01); *G08B 17/06* (2013.01); *G08B 29/043* (2013.01)

(58) Field of Classification Search
CPC .... G08B 21/182; G08B 17/06; G08B 29/043; G06F 9/542
See application file for complete search history.

(56) References Cited

U.S. PATENT DOCUMENTS

| | | | |
|---|---|---|---|
| 5,376,924 A * | 12/1994 | Kubo | G08B 17/117 340/522 |
| 6,107,925 A | 8/2000 | Wong | |
| 6,518,574 B1 | 2/2003 | Castleman | |
| 7,034,701 B1 | 4/2006 | Rose-Pehrsson et al. | |
| 7,969,296 B1 * | 6/2011 | Stell | G08B 17/10 340/522 |
| 8,080,186 B1 | 12/2011 | Pennartz | |
| 8,096,810 B2 | 1/2012 | Blackburn et al. | |
| 10,002,510 B2 * | 6/2018 | Ryder | G01J 5/0846 |
| 2006/0289175 A1 * | 12/2006 | Gutowski | A62C 2/24 169/46 |

(Continued)

FOREIGN PATENT DOCUMENTS

| | | |
|---|---|---|
| CN | 202315059 U | 7/2012 |
| CN | 203149762 | 8/2013 |

(Continued)

*Primary Examiner* — Mohamed Barakat
(74) *Attorney, Agent, or Firm* — Cantor Colburn LLP

(57) ABSTRACT

According to an aspect, a method of fire type detection and notification includes receiving a plurality of sensor data from a plurality of sensors operable to detect one or more fire conditions. One or more changes in the sensor data are detected from at least one of the sensors. A fire type is classified based on the one or more changes detected in the sensor data. A suppression agent type associated with the fire type is determined. A notification including the fire type and the suppression agent type is output.

20 Claims, 4 Drawing Sheets

(56) References Cited

U.S. PATENT DOCUMENTS

| | | |
|---|---|---|
| 2014/0116734 A1 | 5/2014 | Eckholm et al. |
| 2014/0345884 A1 | 11/2014 | Luong |
| 2015/0079559 A1 | 3/2015 | Blackburn et al. |
| 2016/0121148 A1 | 5/2016 | Al-Hebshi et al. |
| 2017/0039307 A1* | 2/2017 | Koger ................. G06F 17/5004 |

FOREIGN PATENT DOCUMENTS

| | | |
|---|---|---|
| CN | 206700538 U | 12/2017 |
| WO | 2007053737 A2 | 5/2007 |
| WO | 2013124638 A2 | 8/2013 |
| WO | 2015048604 A1 | 4/2015 |

\* cited by examiner

FIRE TYPE DETECTION AND NOTIFICATION

CROSS-REFERENCE TO RELATED APPLICATION

This application claims the benefit of the IN Application No. 201811020422 filed May 31, 2018, which is incorporated herein by reference in its entirety.

BACKGROUND

The subject matter disclosed herein generally relates to the field of fire detection systems, and more particularly to fire type detection and notification.

During a fire emergency, responding personnel may select an extinguishing agent that may not be suitable for extinguishing the particular fire, which can result in an adverse effect. In a panic situation, as the type of fire is unidentified, there is a greater chance that the responding personnel will select the wrong extinguishing agent by simply selecting an extinguishing agent which is nearby to douse the fire. For example, water may not be suitable to extinguish flammable liquids and gases, as well as energized electrical equipment fires.

BRIEF SUMMARY

According to one embodiment, a method of fire type detection and notification includes receiving a plurality of sensor data from a plurality of sensors operable to detect one or more fire conditions. One or more changes in the sensor data are detected from at least one of the sensors. A fire type is classified based on the one or more changes detected in the sensor data. A suppression agent type associated with the fire type is determined. A notification including the fire type and the suppression agent type is output.

In addition to one or more of the features described above, or as an alternative, further embodiments may include where the sensors include at least one thermographic sensor and at least one Doppler sensor.

In addition to one or more of the features described above, or as an alternative, further embodiments may include where classifying the fire type includes determining whether a temperature gradient is above a gradient limit is detected based on the sensor data from the at least one thermographic sensor, determining whether a Doppler development time is above an upper rate limit based on the sensor data from the at least one Doppler sensor, and determining whether the Doppler development time is below a lower rate limit based on the sensor data from the at least one Doppler sensor.

In addition to one or more of the features described above, or as an alternative, further embodiments may include focusing the at least one Doppler sensor toward a fire source based on determining that the temperature gradient is above the gradient limit.

In addition to one or more of the features described above, or as an alternative, further embodiments may include classifying the fire type as a class A fire based on determining that the temperature gradient is above the gradient limit and the Doppler development time is below the lower rate limit.

In addition to one or more of the features described above, or as an alternative, further embodiments may include where the sensors include at least one hydrocarbon sensor.

In addition to one or more of the features described above, or as an alternative, further embodiments may include classifying the fire type as a class B fire based on determining that the temperature gradient is above the gradient limit, the Doppler development time is above the upper rate limit, and hydrocarbon detection is confirmed by the at least one hydrocarbon sensor.

In addition to one or more of the features described above, or as an alternative, further embodiments may include classifying the fire type as a class C fire based on determining that the temperature gradient is above the gradient limit, the Doppler development time is above the upper rate limit, and hydrocarbon detection is unconfirmed by the at least one hydrocarbon sensor.

In addition to one or more of the features described above, or as an alternative, further embodiments may include classifying the fire type as a class B fire based on confirmation of hydrocarbon detection by the at least one hydrocarbon sensor, and detecting a fire/explosion alarm condition based on a temperature change rate above an explosion threshold.

In addition to one or more of the features described above, or as an alternative, further embodiments may include identifying a location of the one or more fire conditions based upon a predetermined placement location of the sensors within a structure, and including an identifier of the location with the notification.

In addition to one or more of the features described above, or as an alternative, further embodiments may include where the notification is output to a user interface through one or more of: a fire alarm panel and a mobile computing device.

According to another embodiment, a system includes a controller configured to establish communication with a plurality of sensors operable to detect one or more fire conditions and at least one alert system. The controller includes a processing system and a memory system including computer-executable instructions that, when executed by the processing system, cause the processing system to perform operations. The operations include receiving a plurality of sensor data from the sensors, detecting one or more changes in the sensor data from at least one of the sensors, classifying a fire type based on the one or more changes detected in the sensor data, determining a suppression agent type associated with the fire type, and outputting a notification including the fire type and the suppression agent type to the alert system.

Technical effects of embodiments of the present disclosure include processing of sensor data from sensors in a particular arrangement, determining a fire type, determining an associated suppression agent type, and outputting a notification.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

As will be described below, embodiments can report a fire type based on determining a likely type of combusting materials (e.g., flammable liquid, flammable gas, energized electrical equipment, or ordinary combustibles) responsive to sensor data from a plurality of sensors. Determination of a fire type can be based on the characteristics of combusting materials, such as a rate of rise of temperature, movement (e.g., spreading) of fire, and presence of hydrocarbons. Once the fire type is determined, first responders can be notified through an alert system, for instance, through a user interface and/or a fire alarm panel. Embodiments can also determine and notify users of a suppression agent type associated with the fire type, such that first responders can select and apply an appropriate suppression agent to douse the fire.

Figure 1:
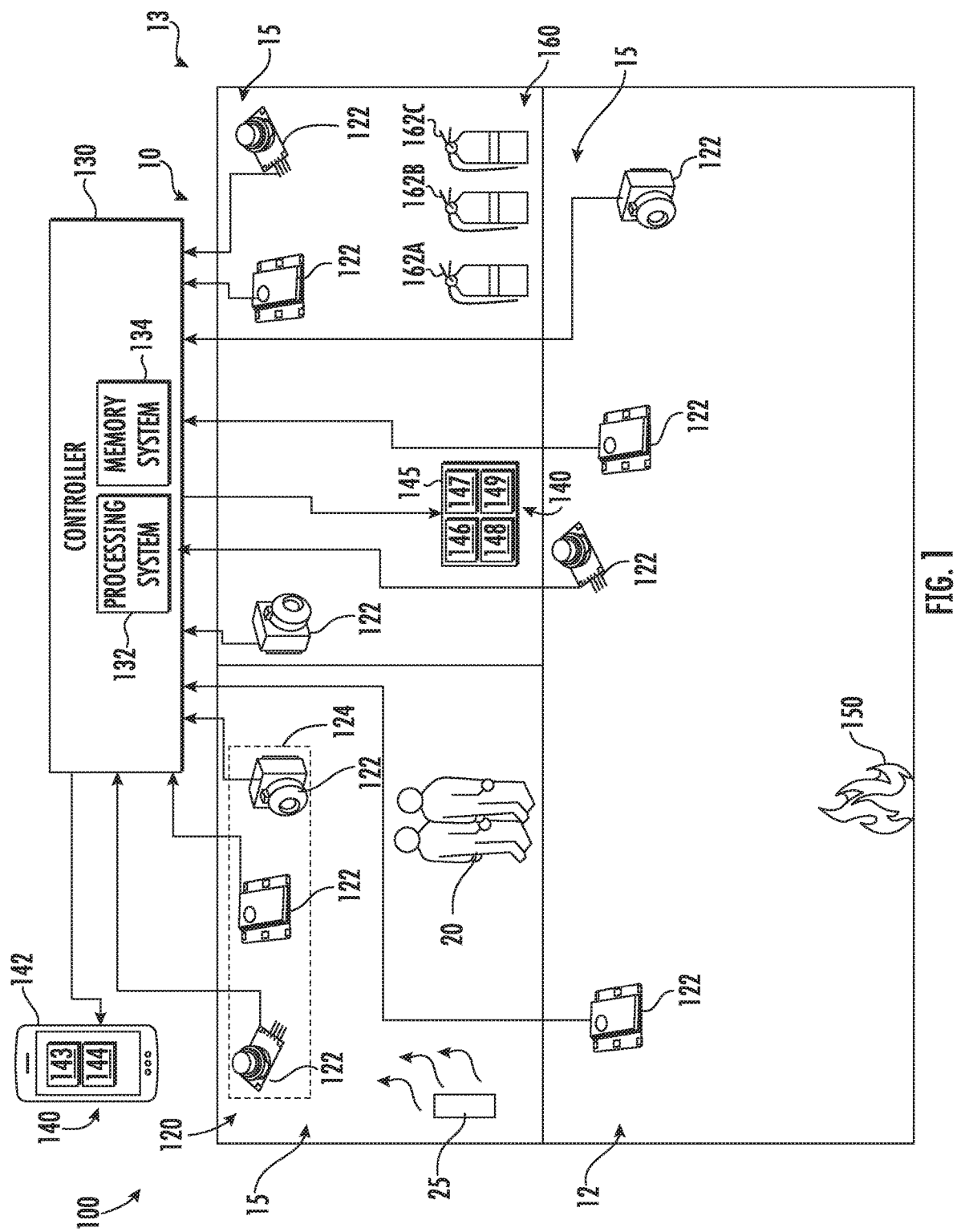
FIG. 1 illustrates a general schematic diagram of a system, in accordance with an embodiment of the disclosure.

With reference to FIG. 1, a system 100 is illustrated, in accordance with an embodiment of the present disclosure. As seen in FIG. 1, the system 100 can be installed in a structure 10, such as a residence, an industrial building, an office building, a commercial building, or other enclosures known in the art. For purposes of clarity and brevity, however, the following description will relate to a case where the structure 10 is configured as a building with multiple rooms, but it is understood that embodiments disclosed herein are not limited to a multi-room building. The structure 10 includes an interior 12 separated from an exterior 13. The interior 12 may be further divided into multiple rooms and areas for various purposes in the illustrated example of FIG. 1, referred to as one or more enclosed spaces 15.

The system 100 includes a sensor system 120 disposed and configured to observe conditions within the one or more enclosed spaces 15. The sensor system 120 includes a plurality of sensors 122 in the one or more enclosed spaces 15. Examples of the sensors 122 can include one or more thermographic sensors, Doppler sensors, and hydrocarbon sensors. In some embodiments, the sensors 122 are distributed in each of the enclosed spaces 15. Two or more of the sensors 122 in the same enclosed space 15 can be incorporated into a shared housing 124. The number and location of specific types of the sensors 122 can vary depending upon the coverage/field-of-view of each type of sensor 122. For example, each enclosed space 15 may include at least one thermographic sensor, at least one Doppler sensor, and at least one hydrocarbon sensor to detect one or more fire conditions at about the same location. Further, one or more of the sensors 122 may be movable/rotatable to provide a greater coverage area without adding additional sensors 122 of the same type in the same enclosed space 15.

When the sensors 122 are embodied as one or more thermographic sensors, such as one or more thermal imaging cameras, the resulting sensor data can be transmitted to a controller 130, for instance, to observe current temperatures, temperature gradients, heat patterns, and changes over time. When the sensors 122 are embodied as one or more Doppler sensors, the resulting sensor data can be transmitted to the controller 130, for instance, to observe the growth and movement of a fire 150 as observed using Doppler radar. When the sensors 122 are embodied as one or more hydrocarbon sensors, the resulting sensor data can be transmitted to the controller 130, for instance, to observe hydrocarbon levels and changes in the hydrocarbon levels. Although a single instance of the controller 130 is depicted in FIG. 1, it will be understood that the controller 130 can be further subdivided and/or distributed locally with respect the sensors 122. For example, a portion of the controller 130 can be located within the housing 124 and/or integrated with the sensors 122 (e.g., smart sensors).

In the example of FIG. 1, the controller 130 is in electronic communication with the sensors 122 of the sensor system 120 and can produce an output to an alert system 140, such as a fire alarm panel 145 and/or computing device(s) including one or more mobile computing devices 142. The controller 130 can be combined with the fire alarm panel 145 or may be physically separate from the fire alarm panel 145. The fire alarm panel 145 can be a control panel with a display 146 and an input/output interface 148 configured to output visual and/or audio information and/or relay data/notifications to other devices. The fire alarm panel 145 may control, commission, and communicate with various fire detection, suppression devices, and notification devices in the structure 10. The one or more mobile computing devices 142 can include any type of portable computer system known in the art, such as a mobile phone, a tablet computer, a laptop, a personal digital assistant, and the like. The electronic communication may be wired and/or wireless. The controller 130 may be an electronic controller including a processing system 132 and a memory system 134 including computer-executable instructions that, when executed by the processing system 132, cause the processing system 132 to perform various operations. The processing system 132 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory system 134 may be a storage device such as, for example, a random access memory (RAM), read only memory (ROM), or other electronic, optical, magnetic or any other computer readable storage medium. Memory system 134 may also store information such as location data related to fire suppression agents 160 and/or sensors 122 as discussed below. Similar to the controller 130, the one or more mobile computing devices 142 can each include a processing system 143 and a memory system 144, and the fire alarm panel 145 can include a processing system 147 and a memory system 149 to support operation of the one or more mobile computing devices 142 and the fire alarm panel 145 respectively.

The following description will also relate to the cases in which the controller 130 is configured for wireless communication. This is described for clarity and brevity and is not intended to otherwise limit the scope of the application as a whole. The controller 130 may have the capability to establish and maintain wireless connectivity over various networks (e.g., Wi-Fi, Bluetooth, Z-Wave, ZigBee, etc.). The controller 130 can therefore be connected to a local Wi-Fi network and the Internet. This may allow the controller 130 to have additional features and capabilities including, but not limited to, being remotely accessible by a user using a mobile computing device 142. The controller 130 may also have a second private wireless communication link operative through any type of network with the sensor system 120. In addition, the link between the controller 130 and one or more instances of the mobile computing device 142 may be developed to automatically pair and connect, for instance, when the mobile computing device 142 is within a communication range of the controller 130.

In some embodiments, thermographic sensors of the sensors 122 may be configured to visually recognize and distinguish features within the enclosed spaces 15, such as one or more occupants 20 and one or more preexisting heat source 25, such as a space heater. The controller 130 and/or the sensors 122 may also be configured to visually recognize heat images patterns as a likely human pattern or other known/trained patterns, such as one or more windows, electronic devices (including lighting), doors, and the like which may radiate heat unevenly within the one or more enclosed spaces 15. Rather than relying only on heat data or smoke detectors, embodiments use multiple types of sensors to both confirm the existence of a fire 150 and determine a classification of fire type of the fire 150.

Fire type classification can be made according to the National Fire Protection Association (NFPA) fire classification standards and/or other standards. For example, a class A fire can result from ordinary combustible materials, such as wood, cloth, paper, rubber and plastics. A class B fire can result from flammable liquids (e.g., burn at room temperature) and combustible liquids (e.g., require heat to ignite), such as petroleum greases, tars, oils, oil-based paints, solvents, lacquers, alcohols, and flammable gases. A class C fire may result from fires involving energized electrical equipment. Other fire classifications are contemplated. Fire suppression agents 160 can include multiple suppression agent types 162A, 162B, 162C, where a particular suppression agent type 162A-162C may be compatible with one or more fire types. For instance, suppression agent type 162A may be a foam-based agent for class A or class B fire types, while suppression agent types 162B and 162C may be carbon dioxide or a dry chemical agent for class C fires. Typically such agents 162A-C are stored in fixed or portable extinguishers such as those depicted at 160, and may be placed in various locations throughout an interior 12 for use in the event of a fire. Additionally, first responders may transport agents to a fire, e.g. in a fire truck or tanker. Processing performed by the controller 130 to classify the fire type of the fire 150 and determine a suppression agent type 162A-162C is further described herein in reference to FIGS. 3 and 4.

Figure 2:
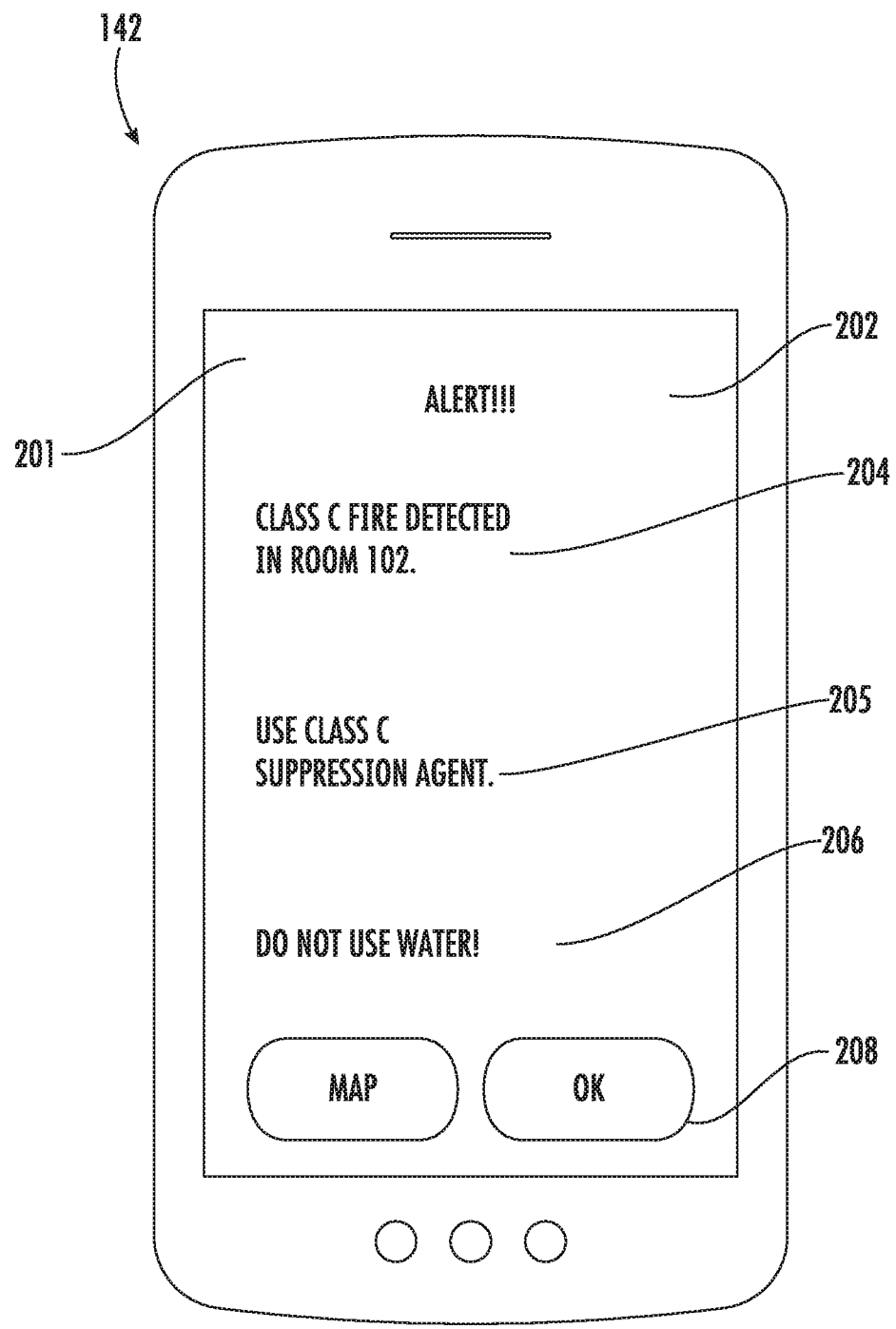
FIG. 2 illustrates a user interface of an alert system, in accordance with an embodiment of the disclosure.

FIG. 2 illustrates a user interface 201 of a mobile computing device 142 that is an embodiment of the alert system 140 of FIG. 1. In the example of FIG. 2, the user interface 201 displays an alert message 202 including an observed condition 204 and recommended action 205 based on a notification from the controller 130 of FIG. 1. The observed condition 204 can include a fire type as determined by the controller 130 and may also include an identifier of a location of one or more fire conditions within the structure 10 of FIG. 1. The recommended action 205 can include a recommended selection from the suppression agent types 162A-162C of FIG. 1 as determined by the controller 130. Further, a warning message 206 can be provided that is associated with the fire type, for instance, listing types of suppression agents to avoid using. In some embodiments, one or more locations of the suppression agent types 162A-162C within the structure may also be provided on the user interface 201. The user interface 201 may also provide one or more options 208, such as a 'MAP' option to graphically identify one or more locations within the structure 10, and an 'OK' option to acknowledge the notification. It will be understood that the example of FIG. 2 is non-limiting and many variations of the user interface 201 are possible. For instance, the user interface 201 can prompt a user to take further actions, establish communication with other responders, and/or trigger other events.

Figure 3:
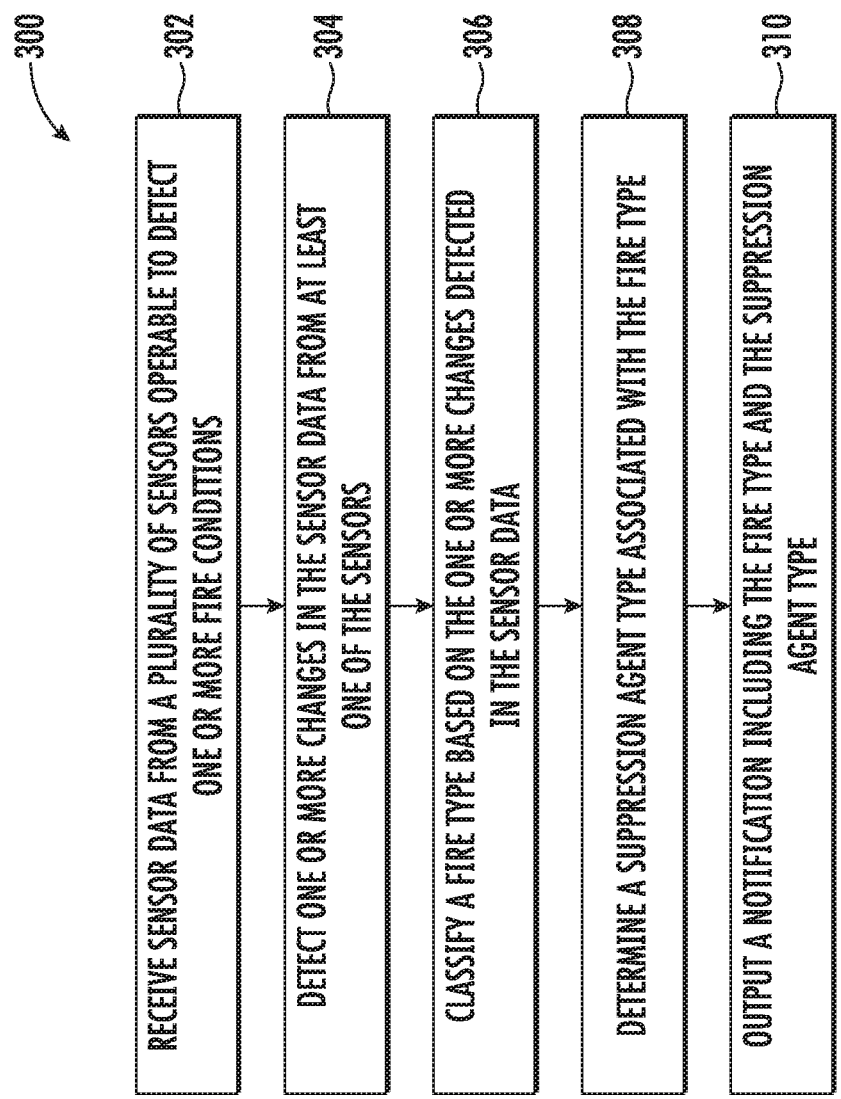
FIG. 3 is a flow diagram illustrating a process according to an embodiment of the present disclosure.

Referring now to FIG. 3 with continued reference to FIGS. 1 and 2, FIG. 3 depicts a flow chart of a method 300 of fire type detection and notification in accordance with an embodiment of the disclosure. The method 300 can be performed by the controller 130 and/or other elements of the system 100.

At block 302, the controller 130 receives sensor data from a plurality of sensors 122 operable to detect one or more fire conditions. For example, the sensor data can include thermal image data, Doppler data, and hydrocarbon data captured by the sensor system 120 in one or more enclosed spaces 15 of the structure 10.

At block 304, the controller 130 can detect one or more changes in the sensor data from at least one of the sensors 122. Changes can include gradient changes within a same data set and/or changes observed over a period of time, such as movement/growth of a fire 150.

At block 306, the controller 130 can classify a fire type based on the one or more changes detected in the sensor data. The classification of fire type can be performed according to the example of FIG. 4 as further described herein.

At block 308, the controller 130 determines a suppression agent type 162A-162C associated with the fire type. The association may be stored in the memory 134 and can be defined in a table, file, database, or other format that maps a list of known fire types to known types of fire suppression agents 160.

At block 310, the controller 130 can output a notification including the fire type and the suppression agent type to an alert system 140. In some embodiments, the controller 130 can identify a location of the one or more fire conditions based upon a predetermined placement location of the sensors 122 within the structure 10, which may be stored in the memory 134. An identifier of the location can be included with the notification. The identifier may be a description of a location, e.g. a room number, floor, quadrant, GPS coordinate, building management system map entry, or other data format that may be transmitted within the notification. The notification can be output to a user interface 201 through one or more of: a display 146 of a fire alarm panel 145 and a mobile computing device 142; the notification may also be output to responders via transmission through fire alarm panel 145.

While the above description has described the flow process of FIG. 3 in a particular order, it should be appreciated that unless otherwise specifically required in the attached claims that the ordering of the steps may be varied.

Figure 4:
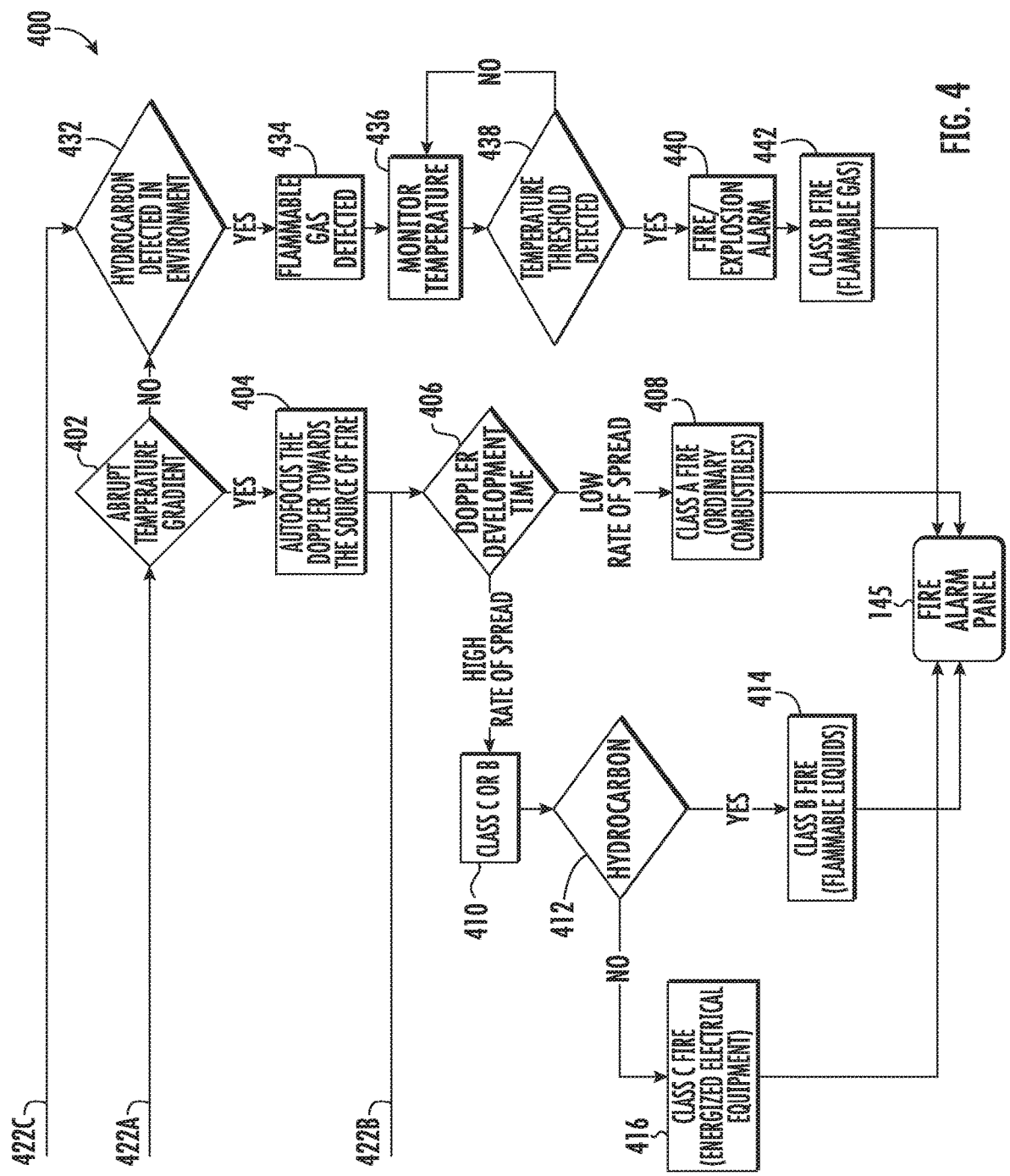
FIG. 4 is a flow diagram illustrating a process according to an embodiment of the present disclosure.

Referring now to FIG. 4 with continued reference to FIGS. 1-3, FIG. 4 depicts a flow chart of a method 400 of fire type classification in accordance with an embodiment of the disclosure. The method 400 can be performed by the controller 130.

At block 402, the controller 130 can determine whether a temperature gradient above a gradient limit is detected based on the sensor data from at least one thermographic sensor 422A of the sensors 122 of FIG. 1. If an abrupt change in temperature is detected at block 402 (e.g., temperature gradient is above a gradient limit), a Doppler sensor 422B of the sensors 122 of FIG. 1 can change focus towards the likely source of fire 150 and measure a Doppler development time. At block 406, the controller 130 can determine whether the Doppler development time is above an upper rate limit based on the sensor data from at least one Doppler sensor 422B. The controller 130 may further determine whether the Doppler development time is below a lower rate limit based on the sensor data from the at least one Doppler sensor 422B. In some embodiments, focusing of the at least one Doppler sensor 422B toward a fire source can be performed as an auto-focus action based on determining that the temperature gradient is above the gradient limit, for instance, where the thermographic sensor 422A provides location information for focusing/adjusting the at least one Doppler sensor 422B.

The controller 130 can classify the fire type as a class A fire at block 408 based on determining that the temperature gradient is above the gradient limit and the Doppler development time is below the lower rate limit. A class A fire may be characterized by a lower spread rate and an abrupt temperature gradient indicative of ordinary combustibles.

Based on determining that the temperature gradient is above the gradient limit at block 402 and the Doppler development time is above an upper rate limit at block 406, the controller 130 may conclude that the fire 150 is a class B or C fire type at block 410. If hydrocarbon is present, as determined by sensor data from at least one hydrocarbon sensor 422C of the sensors 122 of FIG. 1 at block 412, then the fire 150 is likely due to a flammable liquid, and thus the controller 130 can classify the fire type as a class B fire at block 414. A class B fire may be characterized by a higher spread rate, hydrocarbon presence, and an abrupt temperature gradient indicative of flammable liquids.

The controller 130 can classify the fire type as a class C fire at block 416 based on determining that the temperature gradient is above the gradient limit at block 402, the Doppler development time is above the upper rate limit at block 406, and hydrocarbon detection is unconfirmed by the at least one hydrocarbon sensor 422C at block 412. A class C fire may be characterized by a higher spread rate, hydrocarbon absence, and an abrupt temperature gradient indicative of energized electrical equipment.

If the presence of hydrocarbon is detected, which indicates flammable gas presence, and a temperature change rate is observed above an explosion threshold, this can be indicative of a flammable gas, i.e., class B fire, which will likely lead to a fire explosion. At block 432, the controller 130 can confirm hydrocarbon detection by the at least one hydrocarbon sensor 422C, which is indicative of flammable gas detection at block 434. At block 436, the controller 130 can monitor temperature using sensor data from at least one thermographic sensor 422A. At block 438, a comparison of the temperature to an explosion threshold is performed until the temperature exceeds the explosion threshold and a fire/explosion alarm condition is confirmed at block 440. At block 442, the fire type can be classified as a class B fire based on confirmation of hydrocarbon detection at block 432 by the at least one hydrocarbon sensor 422C, and detecting a fire/explosion alarm condition at block 440 based on a temperature change rate above an explosion threshold at blocks 436 and 438. Thus, a class B fire may be characterized by hydrocarbon presence indicative of a flammable gas.

A notification of the fire type as determined in blocks 408, 414, 416, and 442 along with a corresponding agent type 162A-162C can be output to an alert system 140, such as the display 146 of the fire alarm panel 145. In some embodiments, the fire alarm panel 145 can distribute the notification to one or more other computer systems, e.g., through a communication network, such as to one or more mobile computing devices 142 of FIG. 2.

While the above description has described the flow process of FIG. 4 in a particular order, it should be appreciated that unless otherwise specifically required in the attached claims that the ordering of the steps may be varied. Values for the various limits and thresholds of the flow process of FIG. 4 can be determined experimentally in lab conditions for a variety of material types and may be later updated as additional results are collected.

As described above, embodiments of the invention can be in the form of processor-implemented processes and devices for practicing those processes, such as a processor. For example, processing aspects can be performed on one or more of the processing systems 132, 143, 147 of FIG. 1. Embodiments can also be in the form of computer program code containing instructions embodied in tangible media, such as network cloud storage, SD cards, flash drives, floppy diskettes, CD ROMs, hard drives, or any other computer-readable storage medium such as memory system 134, 144, 149 of FIG. 1, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
receiving a plurality of sensor data from a plurality of sensors operable to detect one or more fire conditions, wherein the sensors comprise at least one thermographic sensor and at least one Doppler sensor;
detecting one or more changes in the sensor data from at least one of the sensors;
classifying a fire type based on the one or more changes detected in the sensor data by determining whether the temperature gradient is above a gradient limit is detected based on the sensor data from the at least one thermographic sensor, determining whether a Doppler development time is above an upper rate limit based on the sensor data from the at least one Doppler sensor, and determining whether the Doppler development time is below a lower rate limit based on the sensor data from the at least one Doppler sensor;
determining a suppression agent type associated with the fire type; and
outputting a notification comprising the fire type and the suppression agent type.

2. The method of claim 1, further comprising:
focusing the at least one Doppler sensor toward a fire source based on determining that the temperature gradient is above the gradient limit.

3. The method of claim 1, wherein the step of classifying a fire type based on the one or more changes detected in the sensor data further comprises determining that the temperature gradient is above the gradient limit and the Doppler development time is below the lower rate limit.

4. The method of claim 3, wherein the step of outputting a notification comprising the fire type and the suppression agent type further comprises outputting a class A fire type.

5. The method of claim 1, wherein the sensors comprise at least one hydrocarbon sensor, and the step of classifying a fire type based on the one or more changes detected in the sensor data further comprises:
determining that the temperature gradient is above the gradient limit, the Doppler development time is above the upper rate limit, and hydrocarbon detection is confirmed by the at least one hydrocarbon sensor.

6. The method of claim 5, wherein the step of outputting a notification comprising the fire type and the suppression agent type further comprises outputting a class B fire type.

7. The method of claim 1, wherein the sensors comprise at least one hydrocarbon sensor, and the step of classifying a fire type based on the one or more changes detected in the sensor data further comprises:
determining that the temperature gradient is above the gradient limit, the Doppler development time is above the upper rate limit, and hydrocarbon detection is unconfirmed by the at least one hydrocarbon sensor.

8. The method of claim 7, wherein the step of outputting a notification comprising the fire type and the suppression agent type further comprises outputting a class C fire type.

9. The method of claim 1, wherein the sensors comprise at least one hydrocarbon sensor, and the step of classifying a fire type based on the one or more changes detected in the sensor data further comprises:
confirming hydrocarbon detection by the at least one hydrocarbon sensor; and
detecting a fire/explosion alarm condition based on a temperature change rate above an explosion threshold.

10. The method of claim 9, wherein the step of outputting a notification comprising the fire type and the suppression agent type further comprises outputting a class B fire type.

11. The method of claim 1, further comprising:
identifying a location of the one or more fire conditions based upon a predetermined placement location of the sensors within a structure; and
wherein the notification further comprises an identifier of the location.

12. The method of claim 1, wherein the notification is output to a user interface through one or more of: a fire alarm panel and a mobile computing device.

13. A system comprising:
a controller configured to establish communication with a plurality of sensors operable to detect one or more fire conditions and at least one alert system, the controller comprising:
a processing system; and
a memory system comprising computer-executable instructions that, when executed by the processing system, cause the processing system to perform operations, the operations comprising:
receiving a plurality of sensor data from the sensors, wherein the sensors comprise at least one thermographic sensor and at least one Doppler sensor;
detecting one or more changes in the sensor data from at least one of the sensors;
classifying a fire type based on the one or more changes detected in the sensor data by determining whether the temperature gradient is above a gradient limit is detected based on the sensor data from the at least one thermographic sensor, determining whether a Doppler development time is above an upper rate limit based on the sensor data from the at least one Doppler sensor, and determining whether the Doppler development time is below a lower rate limit based on the sensor data from the at least one Doppler sensor;
determining a suppression agent type associated with the fire type; and
outputting a notification comprising the fire type and the suppression agent type to the alert system.

14. The system of claim 13, wherein the controller is further configured to perform the operations comprising:
focusing the at least one Doppler sensor toward a fire source based on determining that the temperature gradient is above the gradient limit.

15. The system of claim 13, wherein the step of classifying a fire type based on the one or more changes detected in the sensor data further comprises determining that the temperature gradient is above the gradient limit and the Doppler development time is below the lower rate limit.

16. The system of claim 15, wherein the step of outputting a notification comprising the fire type and the suppression agent type further comprises outputting a class A fire type.

17. The system of claim 13, wherein the sensors comprise at least one hydrocarbon sensor, and the step of classifying a fire type based on the one or more changes detected in the sensor data further comprises:
determining that the temperature gradient is above the gradient limit, the Doppler development time is above the upper rate limit, and hydrocarbon detection is confirmed by the at least one hydrocarbon sensor.

18. The system of claim 17, wherein the step of outputting a notification comprising the fire type and the suppression agent type further comprises outputting a class B fire type.

19. The system of claim 13, wherein the sensors comprise at least one hydrocarbon sensor, and the step of classifying a fire type based on the one or more changes detected in the sensor data further comprises:

determining that the temperature gradient is above the gradient limit, the Doppler development time is above the upper rate limit, and hydrocarbon detection is unconfirmed by the at least one hydrocarbon sensor.

20. The system of claim 19, wherein the step of outputting a notification comprising the fire type and the suppression agent type further comprises outputting a class C fire type.

* * * * *